United States Patent
Liu et al.

(10) Patent No.: US 12,091,059 B2
(45) Date of Patent: Sep. 17, 2024

(54) SYSTEM AND METHOD OF MANAGING A DRIVER TAKE-OVER FROM AN AUTONOMOUS VEHICLE BASED ON MONITORED DRIVER BEHAVIOR

(71) Applicant: GM Global Technology Operations LLC, Detroit, MI (US)

(72) Inventors: Ke Liu, North Billerica, MA (US); Ron Hecht, Raanana (IL); Yi Guo Glaser, West Bloomfield, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 17/530,006

(22) Filed: Nov. 18, 2021

(65) Prior Publication Data
US 2023/0150552 A1   May 18, 2023

(51) Int. Cl.
*B60W 60/00* (2020.01)
*B60W 30/16* (2020.01)
(Continued)

(52) U.S. Cl.
CPC ........ *B60W 60/0059* (2020.02); *B60W 30/16* (2013.01); *B60W 40/04* (2013.01);
(Continued)

(58) Field of Classification Search
CPC ....... B60W 60/0059; B60W 2540/223; B60W 30/16; B60W 40/04; B60W 40/08;
(Continued)

(56) References Cited

U.S. PATENT DOCUMENTS

| | | | |
|---|---|---|---|
| 2018/0148071 A1* | 5/2018 | Kim | G05D 1/0061 |
| 2021/0291869 A1* | 9/2021 | Hutchings | B60W 40/08 |

(Continued)

OTHER PUBLICATIONS

Yu, D., Park, C., Choi, H., Kim, D., & Sung-Ho, H. (2021). Takeover safety analysis with driver monitoring systems and Driver-Vehicle interfaces in highly automated vehicles. Applied Sciences, 11(15), 6685. doi:http://dx.doi.org/10.3390/app11156685.*

*Primary Examiner* — Christian Chace
*Assistant Examiner* — Katherine Marie Fitzharris
(74) *Attorney, Agent, or Firm* — Vivacqua Crane, PLLC

(57) ABSTRACT

A method of managing operator take-over of autonomous vehicle. The method includes gathering information on an external surrounding of the autonomous vehicle; analyzing the gathered information on the external surrounding of the autonomous vehicle to determine an upcoming traffic pattern; gathering information on an operator of the autonomous vehicle; analyzing the gathered information on the operator of the autonomous vehicle to determine an operator behavior; predicting an operator action based on the determined upcoming traffic pattern and the determined operator behavior; and initiating a predetermined vehicle response based on the predicted operator action. The predicting the operator action includes comparing the determined upcoming traffic pattern with a similar historic traffic pattern and retrieving a historical operator action in response to the similar historical pattern.

16 Claims, 8 Drawing Sheets

(51) Int. Cl.
  *B60W 40/04* (2006.01)
  *B60W 40/08* (2012.01)
  *B60W 50/00* (2006.01)
  *B60W 50/10* (2012.01)
  *B60W 50/14* (2020.01)
  *H04W 4/44* (2018.01)

(52) U.S. Cl.
  CPC ........ *B60W 40/08* (2013.01); *B60W 50/0097* (2013.01); *B60W 50/10* (2013.01); *B60W 50/14* (2013.01); *B60W 60/0053* (2020.02); *H04W 4/44* (2018.02); *B60W 2050/009* (2013.01); *B60W 2540/223* (2020.02); *B60W 2540/225* (2020.02); *B60W 2554/801* (2020.02); *B60W 2556/10* (2020.02); *B60W 2556/45* (2020.02)

(58) Field of Classification Search
  CPC .. B60W 50/0097; B60W 50/10; B60W 50/14; B60W 60/0053; B60W 2050/009; B60W 60/0051; B60W 60/0061; H04W 4/44
  See application file for complete search history.

(56) References Cited

U.S. PATENT DOCUMENTS

2021/0300430 A1\* 9/2021 Kang ................ G06N 20/00
2021/0316720 A1\* 10/2021 Dewey ............... G06Q 40/08

\* cited by examiner

SYSTEM AND METHOD OF MANAGING A DRIVER TAKE-OVER FROM AN AUTONOMOUS VEHICLE BASED ON MONITORED DRIVER BEHAVIOR

INTRODUCTION

The present disclosure relates to Advanced Driver Assistance System equipped vehicles, more specifically to a system and method of managing a driver take-over from the Advanced Driver Assistance System based on monitored behavior of the vehicle operator.

Advanced Driver Assistance Systems (ADAS) are intelligent systems that reside onboard a vehicle and assist the driver, also referred to as the vehicle operator, in the operation of the vehicle. ADAS are used to enhance or automate selective motor vehicle systems in order to increase the vehicle operator's driving performance or increase the levels of autonomous driving in accordance with SAE J3016 levels of Driving Automation. A typical ADAS includes an ADAS module that is in communication with various vehicle exterior sensors, vehicle state sensors, and selective vehicle control systems such as steering, acceleration, and braking systems. The ADAS module analyzes information gathered by the exterior sensors and vehicle state sensors to generate and communicates instructions to the vehicle control systems for partial or full autonomous control of the vehicle. The ADAS may also include a Driver Monitoring System (DMS) having a DMS module that is in communications with various vehicle interior sensors configured to monitor the behavior of the vehicle operator, such as eye glances, facial expressions, body movements, and other subject related factors to predict the fatigue, distraction, and emotional state of the vehicle operator.

In one operating scenario, when the ADAS is operating in a lower-level autonomous mode (i.e. SAE J3016 levels 0-2) and the DMS detects the vehicle operator is potentially fatigued or distracted, the DMS may activate an audible or visual alert to warn the vehicle operator and/or communicate with the ADAS module to take over the control of the vehicle from the vehicle operator. In another operating scenario, when the ADAS is operating in a higher-level autonomous mode (i.e. SAE J3016 level 3-5) and the ADAS module encounters a driving scenario that might require manual control of the vehicle, the ADAS may instruct the DMS to activate an audible or visual alert to request the vehicle operator to take manual control of the vehicle. In yet another operating scenario, when the ADAS is operating in partial to full autonomous mode and the vehicle operator has insufficient confidence that the ADAS is capable of adequately negotiating a traffic situation, the vehicle operator may voluntary take-over control of the ADAS.

The vehicle operator taking-over control of the ADAS is referred to as taking-over control of the autonomous vehicle, or simply as take-over. The ADAS requesting the vehicle operator to take manual control of the vehicle is referred to as handing-over control of the autonomous vehicle, or simply as hand-over.

Thus, while ADAS equipped vehicles having DMS achieve their intended purpose, there is a need for continuous improvement to enhance the quality of experience of the vehicle operator by reducing the perceived need or desire for the vehicle operator to take-over control from the ADAS and by reducing the frequency of hand-over requests for the vehicle operator to take-over control from the ADAS.

SUMMARY

A method of managing operator take-over of autonomous vehicle. The method includes gathering information on an external surrounding of the autonomous vehicle; analyzing the gathered information on the external surrounding of the autonomous vehicle to determine an upcoming traffic pattern; gathering information on an operator of the autonomous vehicle; analyzing the gathered information on the operator of the autonomous vehicle to determine an operator behavior; predicting an operator action based on the determined upcoming traffic pattern and the determined operator behavior; and initiating a predetermined vehicle response based on the predicted operator action. The predicting of the operator action includes comparing the determined upcoming traffic pattern with a similar historic traffic pattern and retrieving a historical operator action in response to the similar historical pattern.

A method of managing a vehicle operator's intent, due to perceived need or desire, to take-over control of an autonomous vehicle is disclosed. The method includes gathering, by at least one exterior sensor, information on an upcoming traffic pattern; gathering, by at least one interior sensor, information on a behavior of the vehicle operator; analyzing the behavior of the vehicle operator in response to the upcoming traffic pattern to determine when the vehicle operator has a perceived need to take-over control of the autonomous vehicle; and initiating a change in a dynamic of the autonomous vehicle to eliminate the perceived need of the vehicle operator to take-over control of the autonomous vehicle.

A method of managing a warning priority to an operator of a vehicle. The method includes gathering exterior information on a surrounding about the vehicle; gathering interior information on the operator of the vehicle; analyzing the exterior information to determine an upcoming traffic pattern; analyzing the interior information to determine an operator behavior in response to the upcoming traffic pattern; predicting an operator action based on the determined operator behavior in a response to the determined upcoming traffic pattern; and prioritizing a warning based on the predicted operator action.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, a module or control module means any one or various combinations of one or more processors, associated memory, and other components operable to execute a software, firmware, program, instruction, routine, code, and algorithm to provide the described functions. Processors include, but not limited to, Application Specific Integrated Circuits (ASIC), electronic circuits, central processing units, microprocessors, and microcontrollers. Associated memory includes, but not limited to, read only memory (ROM), random access memory (RAM), and electrically programmable read only memory (EPROM). Functions of a control module as set forth in this disclosure may be performed in a distributed control architecture among several networked control modules. A control module may include a variety of communication interfaces including point-to-point or discrete lines and wired or wireless interfaces to other control modules.

Software, firmware, programs, instructions, routines, code, algorithms and similar terms mean any control module executable instruction sets including methods, calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing vehicle operation. Alternatively, routines may be executed in response to occurrence of an event, software calls, or on demand via user interface inputs or requests.

Figure 1:
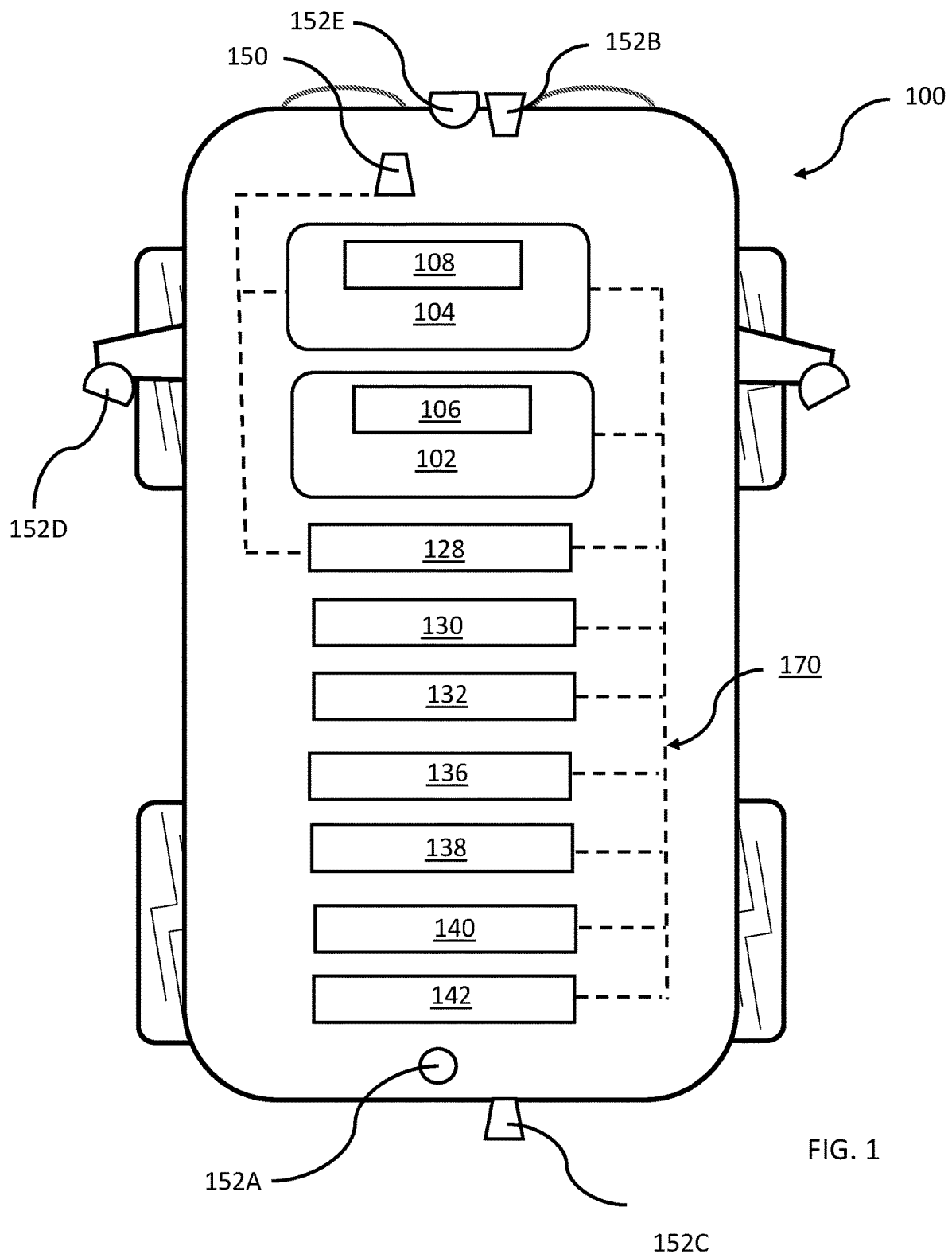
FIG. 1 is a functional diagram of an autonomous vehicle equipped with an Advanced Driver Assistance System (ADAS) having a Driver Monitory System (DMS), according to an exemplary embodiment.

FIG. 1 shows a functional diagram of an exemplary vehicle 100 equipped with an Advanced Driver Assistance System (ADAS) 102 having a Driver Monitoring System (DMS) 104. The ADAS 102 is configured to provide a level of driving automation from partial autonomous mode to full autonomous mode in accordance with SAE J3016 Levels of Driving Automation. Lower levels of driving automation can include a range of dynamic driving and vehicle operation including some level of automatic control or intervention related to simultaneous automatic control of multiple vehicle functions, such as steering, acceleration, and braking, wherein the operator retains partial control of the vehicle. Higher levels of driving automation can also include full automatic control of all vehicle driving functions, including steering, acceleration, braking, and executing maneuvers such as automated lane changes, wherein the driver cedes most or all control of the vehicle for a period of time. The vehicle 100 is also referred to as an autonomous vehicle 100.

The ADAS 102 includes an ADAS module 106, also referred to as an ADAS control module 106, configured to communicate with various systems of vehicle 100, such as a detection system 128, acceleration system 130, steering system 132, navigation system 136, positioning system 138, deceleration system 140, and other systems necessary for partially or fully control the movements, speed, direction, etc. of the vehicle 100. The DMS 104 includes an DMS module 108, also referred to as an DMS control module 108, configured to communicate with the ADAS module 106 and to receive data from at least one internal sensor 150 configured to monitor the vehicle operator (not shown). These vehicle systems 128, 130, 132, 136, 138, 140 may have system specific control modules (not shown) in communications with the ADAS modules 106 for the coordinated control of the vehicle 100. In an alternative embodiment, the ADAS module 106 may function as a main control module for directly controlling all or working in combinations with the system specific control modules to control one or more of the systems 128, 130, 132, 136, 138, 140.

The detection system 128 is in communications with the exterior sensors 152 including, but not limited to, optical laser devices such as a Light Detection and Ranging (LI-DAR) device 152A for having 360 degrees of view about the host vehicle 100, a forward viewing camera 152B, a rearward viewing camera 152C, sideview cameras 152D and range sensors 152E such as radar and sonar devices. The detection system 128 is in communications with the interior sensors 150 including, but not limited to, a camera. Each of these interior sensors 150 and exterior sensors 152 may be equipped with localized processing components which process gathered data and provide processed or raw sensor data directly to one or more of the detection system 128, ADAS module 106, and DMS module 108.

The vehicle 100 may also include a communication system 142 having a circuit configured with Dedicated Short-Range Communications protocol (e.g. WiFi) for communication with other vehicles equipped with similar communication systems. The communication system may be configured for vehicle-to-vehicle communications (V2V), vehicle-to-infrastructure (V2I), and vehicle-to-everything (V2X) communications.

Communications between the ADAS 102, DMS 104, vehicle systems 128, 130, 132, 136, 138, 140, 142, interior sensors 150, and exterior sensors 152, may be implemented by using a direct wired point-to-point link, a networked communication bus link, a wireless link or another suitable communication link 170. Communication includes exchanging data signals in suitable form, including, for example, electrical signals via conductive medium, electromagnetic signals via air, optical signals via optical waveguides, and the like. The data signals may include discrete, analog, or digitized analog signals representing inputs from sensors, actuator commands, and communication between vehicle systems and modules.

Figure 2:
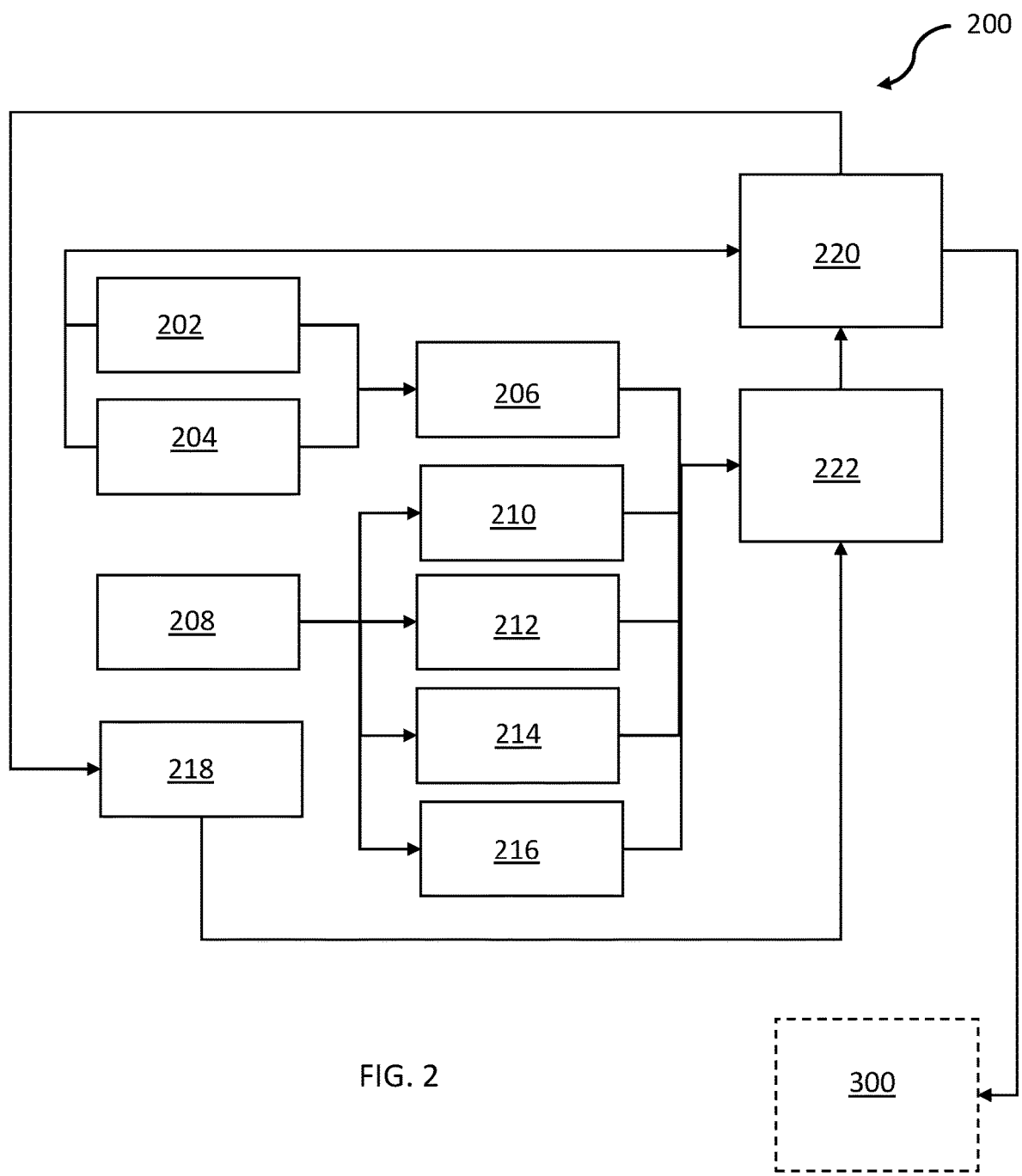
FIG. 2 is a block diagram of a method of managing a driver take-over of the autonomous vehicle of FIG. 1, according to an exemplary embodiment.

FIG. 2 shows a functional block diagram for a method 200 of managing driver take-over of the autonomous vehicle 100. Method 200 enhances the quality of experience of an operator of the autonomous vehicle by (i) reducing or eliminating the perceived need or desire for take-over actions by the operator and (ii) reducing or eliminating the frequency or number of generated alerts, warnings, or notifications for the operator to initiate a take-over action.

The operator of the autonomous vehicle is also referred to as operator of vehicle, vehicle operator, operator, or simply as driver. A take-over action, or take-over, is defined as the vehicle operator initiating an action to take-over a function of the ADAS, also referred to as take-over of the autonomous vehicle. Examples of a take-over action includes, but not limited to, the vehicle operator taking-over operational control of the vehicle from the ADAS by inputting a command onto a steering device, depressing the accelerator pedal, and/or by depressing a brake pedal. The vehicle operator's intent or motivation to initiate a take-over may be due to a perceived need or a desire by the vehicle operator to take over control.

In block 202, the exterior sensors 152 gather information on an external surrounding of the vehicle 100. In block 204, the communication system 142 may receive information wirelessly on the external surrounding of the vehicle 100 from roadside units or other vehicles equipped with V2V or V2X communications. Information gathered from the exterior sensors 152 and wireless communications may include surrounding vehicle layout, vehicle dynamics, road geometry, weather, lightening condition, and other necessary information for the ADAS module to perceive and negotiate through an upcoming traffic pattern. An example of an upcoming traffic pattern includes, but not limited to, a layout or geometry of a road in the path of the autonomous vehicle, vehicles traveling in the road, objects in the road that the autonomous vehicle will need to negotiate through or around, and environmental context such as weather and lighting conditions.

Moving to block 206 from block 202 and block 204, the information collected by the exterior sensors 152 and V2X communications are analyzed to determine an upcoming traffic pattern.

In block 208, the interior sensors 150 gather information on the operator of the autonomous vehicle 100. The information collected by the interior sensors 150 are analyzed to determine the behavior of the operator. The operator's facial expressions, eye glances, body gestures including posture, and other subject related factors are analyzed in blocks 210, 212, 214, and 216, respectively. Subject related factors include fatigue, situation awareness, trust, and the likes.

Moving to block 222, the DMS predicts an operator action based on the determined operator behavior and the determined upcoming traffic pattern. The DMS module 108 executes a prediction model by retrieving historical data from block 218. The historical data includes a plurality of historical traffic patterns and a plurality of historical operator behavior and resulting actions corresponding to the plurality of historical traffic patterns. The DMS module 108 compares the determined upcoming traffic pattern with a similar historical traffic pattern and retrieves a historical operator action corresponding to the similar historical pattern. The DMS module 108 then predicts a tendency and probability of take-over action by the operator by comparing the determined upcoming traffic pattern and observed behavior of the operator with the historical traffic pattern and historical operator behavior.

Each vehicle operator has their own personalized prediction model based on their specific historical data. Each new determined upcoming traffic pattern and corresponding determined operator behavior may be added to the historical data. Referring back to block 222, an optimization algorithm may be utilized to predict more accurately the tendency and probability of operator take-over based on new and historical traffic patterns and operator's behaviors from block 218 in response to these new and historical traffic patterns. The optimization algorithm may be stored in and executed by the DMS module 108.

An example operator behavior that may be used to predict operator take-over and change vehicle dynamics may be that of the operator's glance behavior. The operator's eye glances may be analyzed to determine area of interest, fixation duration, saccade amplitude, etc.

In block 220, the external information gathered in block 202 and block 204 is communicated to the ADAS module. The predicted tendency of take-over/no take-over and probability of take-over action by the operator from block 222 are also communicated to the ADAS module in block 220. The ADAS module communicates with the vehicle system modules 300 to execute a change in vehicle dynamics or vehicle maneuvers to eliminate a perceived need for the take-over action or pre-empt an alert to the operator for taking over.

Figure 3:
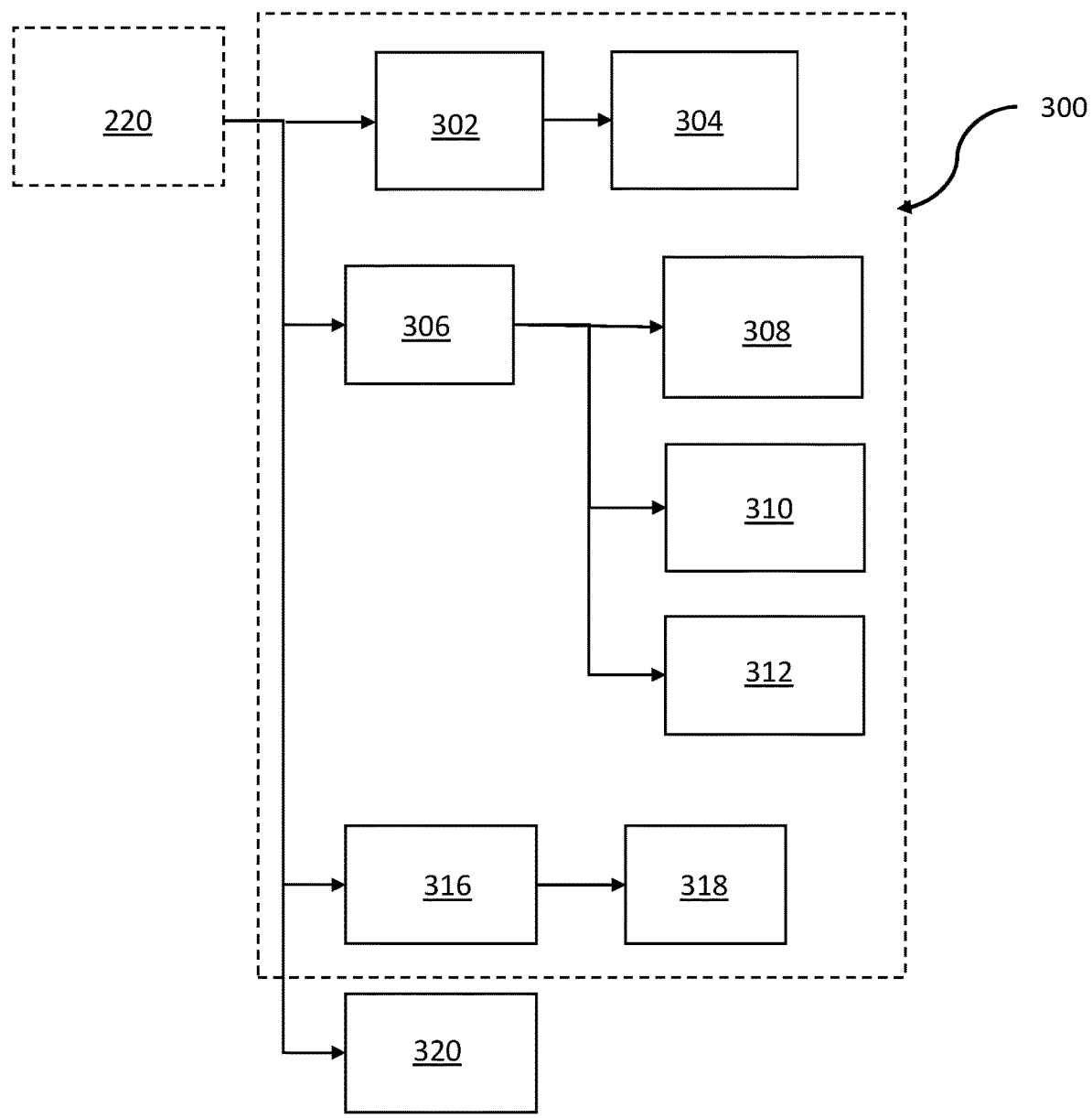
FIG. 3 is a function diagram of an autonomous vehicle system, according to an exemplary embodiment.

Referring to FIG. 3, from block 220, the ADAS module may communicate with steering control module 302 for controlling the EPS motor; the acceleration control module 306 for controlling the engine control module (ECM) 308, torque control module (TCM) 310, and power inverted module (TCM) 312; and electronic brake control module (EBCM) 316 for controlling the brakes 318. In block 320, the priority of escalation of system activations may be predetermined based on the severity of the upcoming traffic pattern and observed operator behavior.

Example 1—Modifying Vehicle Dynamics

Figure 4:
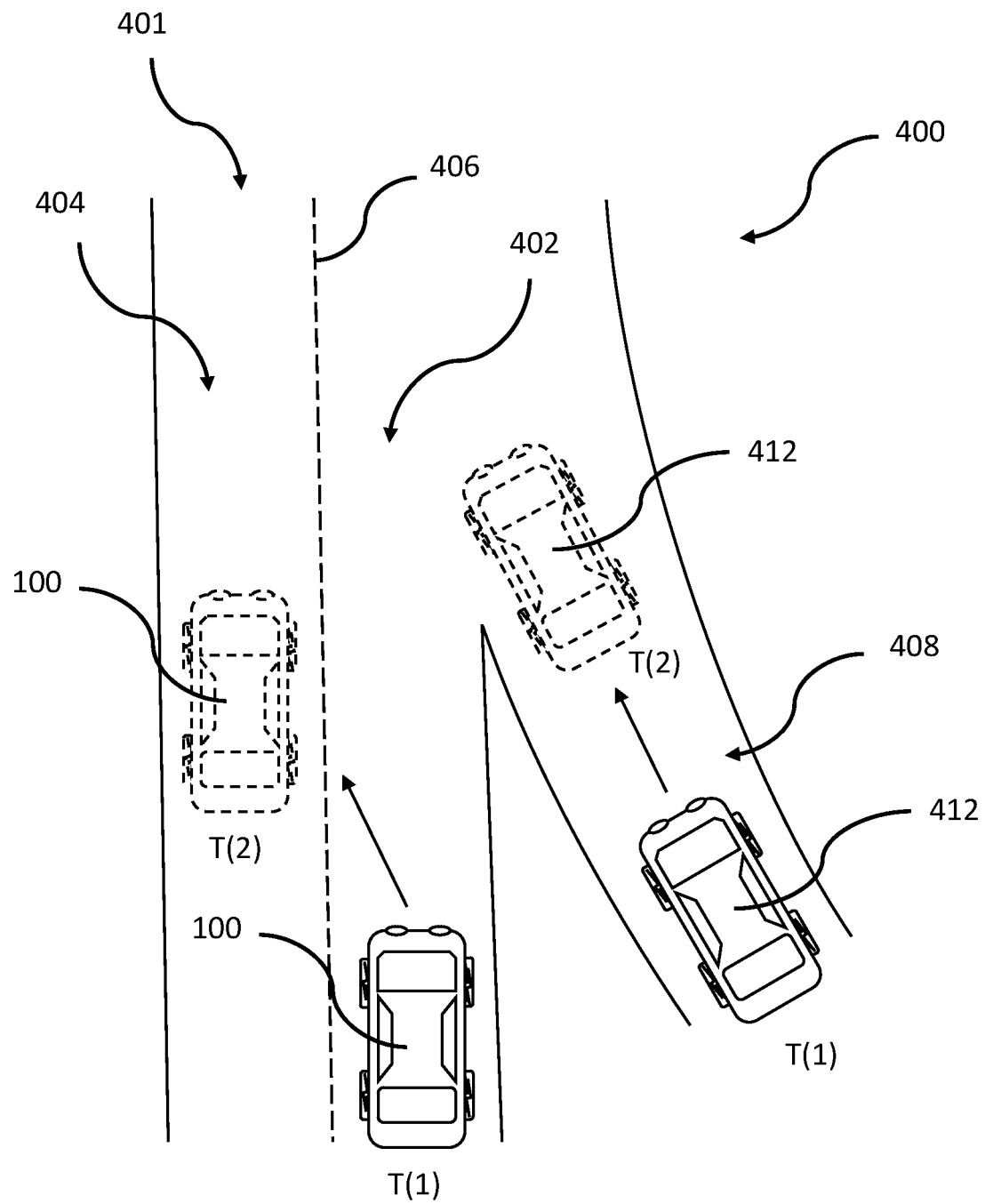
FIG. 4 is a plan view of a traffic pattern that may induce a perceived need or desire for the vehicle operator to take-over control of the autonomous vehicle, according to an exemplary embodiment.
Figure 5:
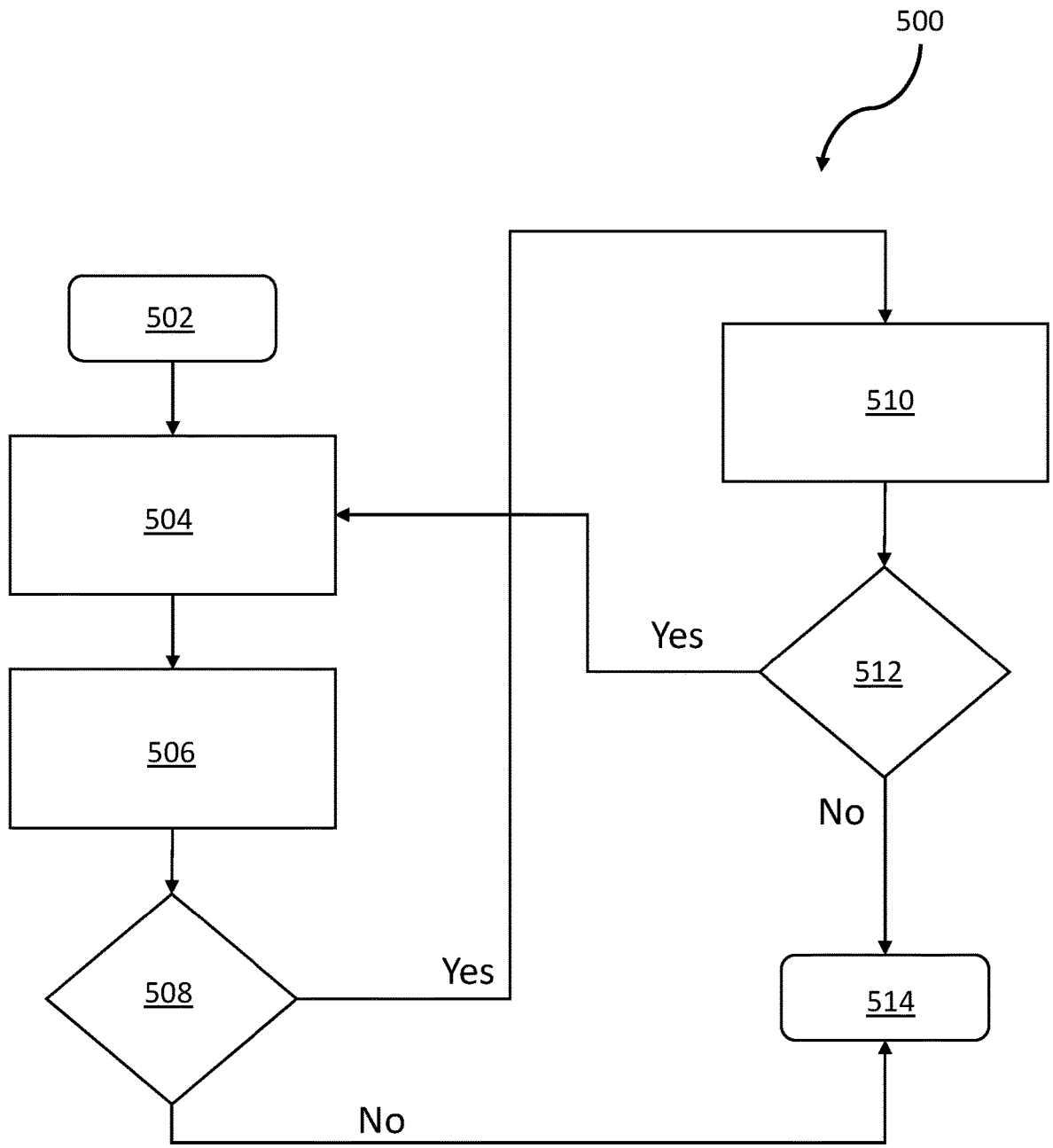
FIG. 5 is a flow block diagram showing a method of managing the perceived need or desire for taking-over the control of the autonomous vehicle, according to an exemplary embodiment.

FIG. 4 shows a plan view 400 of a traffic pattern that may induce a perceived need by the vehicle operator to take-over control of the autonomous vehicle. FIG. 5 shows a block diagram showing a method 500 of managing the vehicle operator's perceived need to take-over the autonomous vehicle by modifying the autonomous vehicle's dynamics.

Referring to FIG. 4, the plan view 400 shows a first example two lane road 401 divided into a first example first lane 402 and a first example second lane 404 by a first example longitudinal dashed line 406. A third lane 408 is shown merging with the first example first lane 402. An autonomous vehicle 100 is shown traveling in the first example first lane 402 at a time stamp 1 (T1) before the third lane 408 intersects the first example first lane 402. A target vehicle 412 is shown in the third lane 408 traveling toward the first example first lane 402 at the time stamp 1 (T1).

Referring to both FIG. 4 and FIG. 5, the method 500 starts in block 502 when the DMS analyses the information gathered by the exterior sensors 152 and determines the upcoming traffic pattern to be an upcoming traffic pattern as shown in FIG. 4 with a target vehicle 412 merging into the first example first lane 402 in which the autonomous vehicle 100 is traveling.

Moving to block 504, the DMS analyzes the information gathered by the interior sensor and determines a behavior of the vehicle operator in response to the upcoming traffic pattern of FIG. 4. The behavior may be interpreted as the vehicle operator having low confidence of the ADAS to negotiate such a traffic pattern or the vehicle operator is concerned with a potential collision with the target vehicle 412. The behavior of the vehicle operator may be determined based on the eye glances, facial expressions, body gestures, and other relevant biometric factors exhibited by the vehicle operator.

Moving to block 506, the DMS predicts a potential take-over by the vehicle operator based on historical data on the historical behavior of vehicle operator when in a similar historical traffic pattern as shown in FIG. 4. The DMS predicts a probability of the vehicle operator taking-over of the autonomous vehicle to avoid the merging target vehicle 412. The DMS may also communicate with the ADAS to determine a probability of collision of the merging target vehicle 412.

Moving to block 508, if the probability of the vehicle operator taking-over control of the autonomous vehicle is above a predetermined take-over level OR if the probability of collision with the merging target vehicle 412 is above a predetermined collision level, then method 500 proceeds to block 510. The term "OR" is defined as an "inclusive or" meaning either this, or that, or both. In block 510, the DMS communicates with the ADAS to modify the dynamics of the autonomous vehicle 100 in block 510 diverting the autonomous vehicle to the first example second lane 404 (e.g. changing lanes) at a position indicated by a time stamp 2 (T2), which is later then time stamp 1 (T1), as the merging target vehicle 412 approaches a position indicated at the time stamp 2 (T2).

Moving to block 512 from block 510, if the vehicle operator initiates a take-over, it means the change in vehicle dynamic from block 510 to mitigate the collision is not the desired way for the vehicle operator. The data point is recorded in historical data in block 504. If the vehicle operator does not initiate a take-over, then the method proceeds to block 514 and ends.

Referring back to block 508, if the probability of the vehicle operator taking-over control of the autonomous vehicle is at or below the predetermined take-over level AND the probability of collision with the merging target vehicle 412 is at or below the predetermined collision level, then the DMS does not intervene to manage the operator take-over of the autonomous vehicle and ends at block 514, then the method proceeds to block 514 and ends.

Example 2—Changing the Warning Priority

Figure 6:
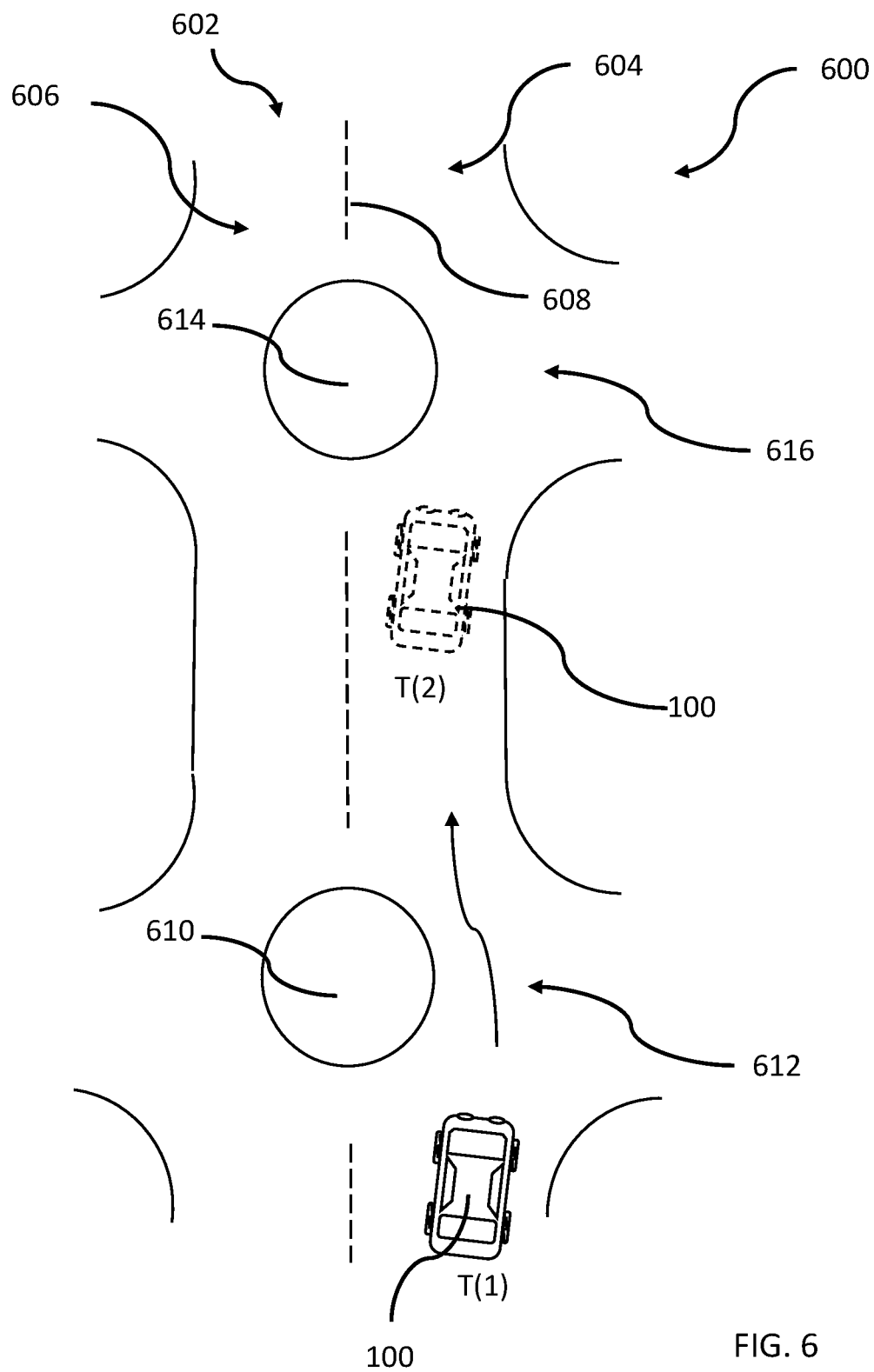
FIG. 6 shows a plan view of a traffic pattern that may induce the ADAS to issue a warning priority for the vehicle operator to take-over control of the autonomous vehicle, according to an exemplary embodiment.
Figure 7:
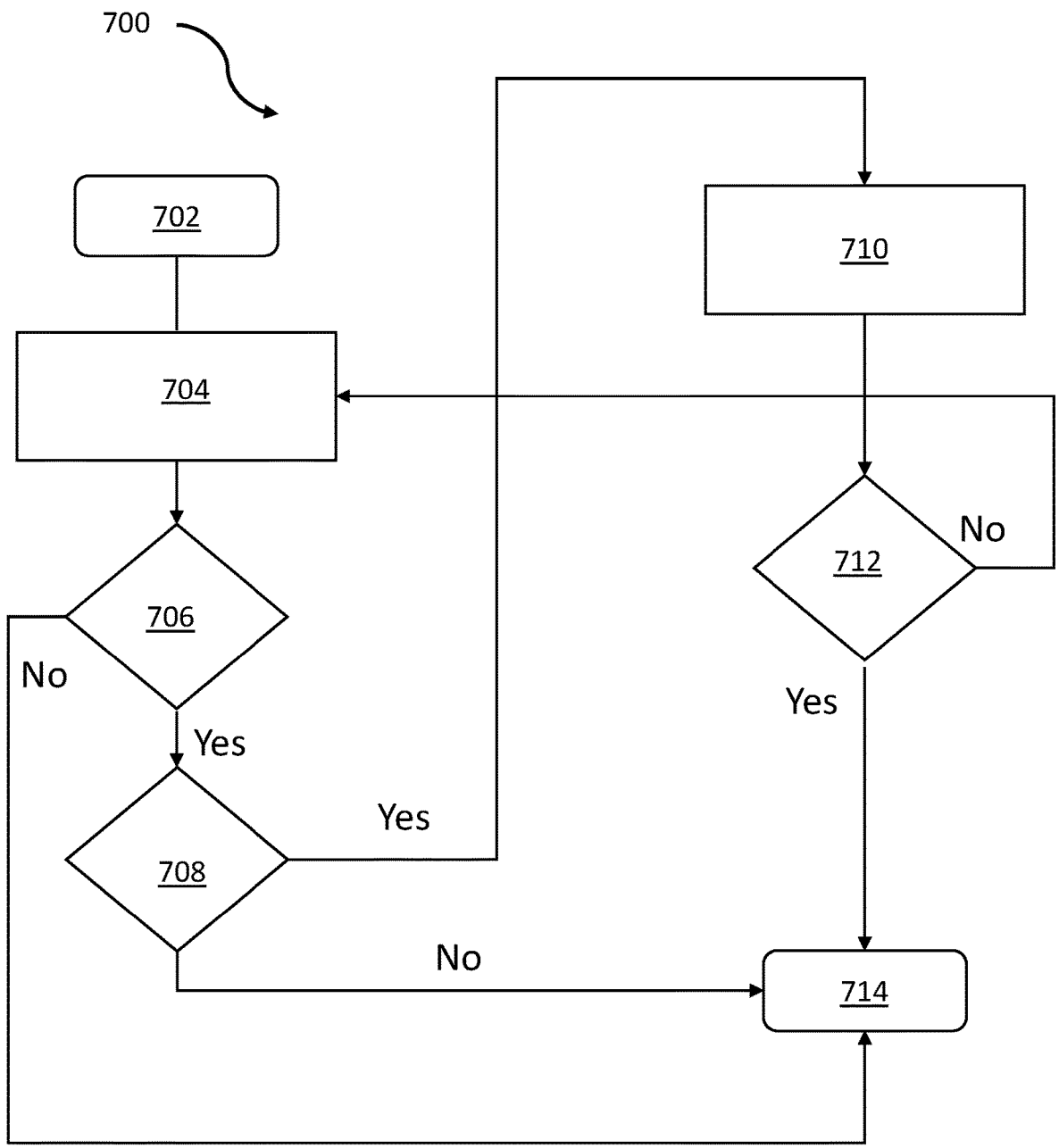
FIG. 7 is a flow block diagram of a method 700 of changing a warning priority to the vehicle operator according to an exemplary embodiment.

FIG. 6 shows a plan view 600 of a traffic pattern that may induce the ADAS to issue a warning or alert for the vehicle operator to take-over control of the autonomous vehicle. FIG. 7 shows a block diagram of a method 700 of changing a warning priority to the vehicle operator.

Referring to FIG. 6, the plan view 600 shows a second example road 602 having a second example first lane 604 and a opposite direction second example second lane 606 separated by a second example dash line 608. A first island 610 is disposed in the second example road 602 separating the two opposite lanes 604, 606 to define a first round-about 612 and a second island 614 is disposed further down the second example road 602 separating the two opposite lanes 604, 606 to define a second round-about 616. An autonomous vehicle 100 is shown traveling in the second example first lane 604 entering the first round-about 612 at time stamp 1 (T1) and entering the second round-about at a later time stamp 2 (T2).

Referring to both FIG. 6 and FIG. 7, the method 700 starts in block 702 when the DMS analyses the information gathered by the exterior sensors 152 and determines the upcoming traffic pattern to be a first round-about potentially followed by a second round-about.

Moving to block 704, the DMS analyzes the information gathered by the interior sensor(s) and determines a behavior of the vehicle operator in response to the upcoming traffic pattern. The behavior of the vehicle operator may be determined based on the eye glances, facial expressions, body gestures, and other relevant biometric factors exhibited by the vehicle operator.

Moving to block 706, the DMS searches the historical data base to determine if the vehicle operator has experienced a similar traffic pattern as shown in FIG. 6. If the historical data has not shown that the vehicle operator has experienced a similar traffic pattern as shown in FIG. 6, then the method 700 moves to block 714 and ends. If the historical data does show that the vehicle operator has experienced a similar traffic pattern as shown in FIG. 6, then the method 700 continues to block 708.

Moving to block 708, the DMS analyzes the information gathered by the interior sensors 150 to determine a probability that the vehicle operator is about to take-over the autonomous vehicle. If the determined probability is at or below a predetermined level, then the method moves to block 714 and ends.

Referring back to block 708, if the determined probability is above the predetermined level, then the DMS communicates with the ADAS to cancel the pending hand-over escalation, for example, by not issuing a driver alert. Moving to block 712, if the vehicle operator does not take-over the autonomous vehicle, the method moves back to block 704 and continues. The failure of hand-over also means that the prediction was inaccurate. Then the data point is recorded in the historical data in block 704 for future alignment. Referring back to 712, if the vehicle operator does take-over the autonomous vehicle, then the method moves to block 714 and ends.

Example 3—Using Glance Behavior to Predict Take-Over

Figure 8:
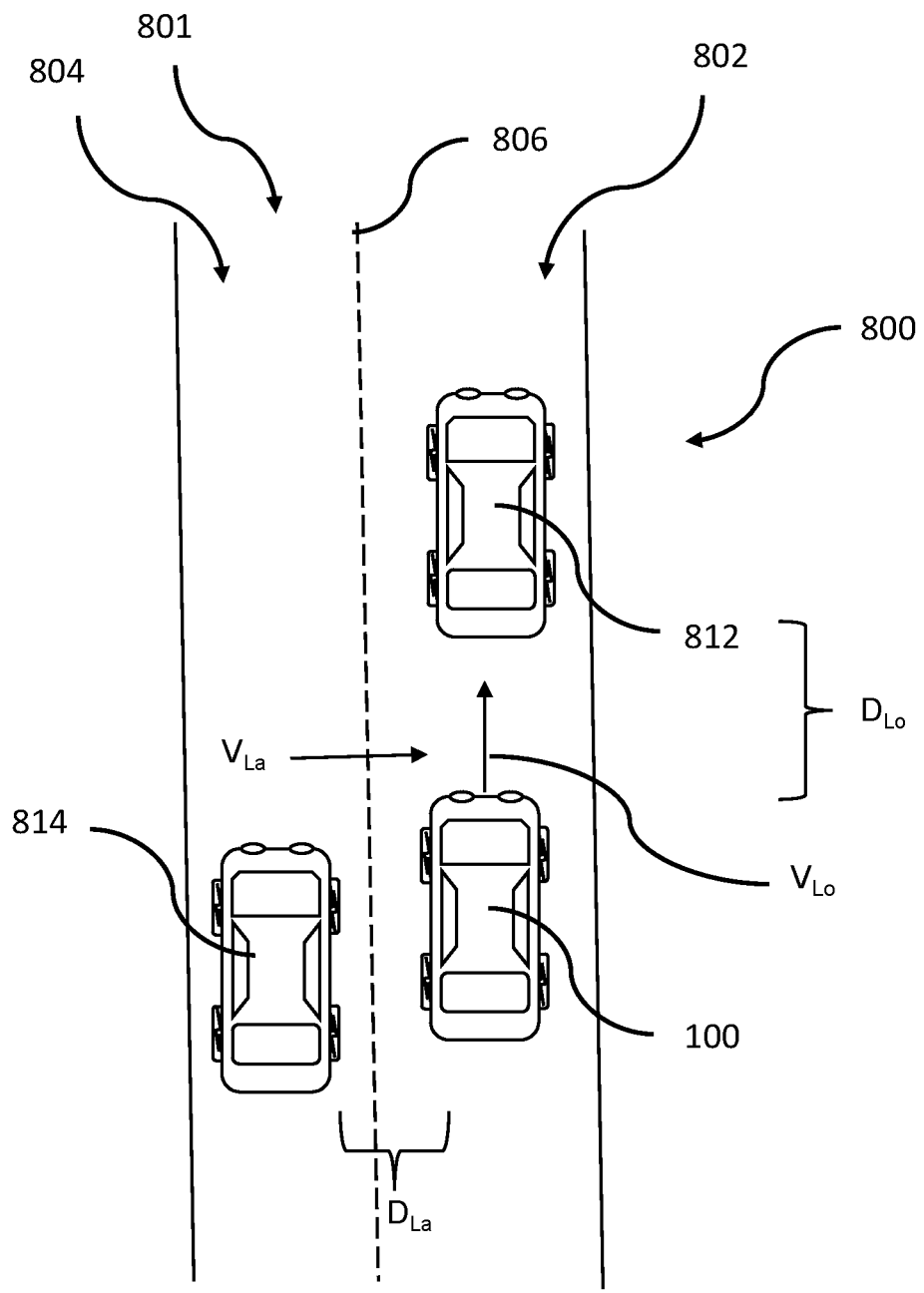
FIG. 8 is a plan view of a traffic pattern where a driver glance behavior may be utilized to predict take-take, according to an exemplary embodiment.

FIG. 8 shows a plan view 800 of a traffic pattern where a glance behavior of the vehicle operator may be utilized to predict a take-over action and to change the vehicle behavior to preempt such a take-over action. The plan view 800 shows a third example two lane road 801 divided into a third example first lane 802 and a third example second lane 804 by a third example longitudinal dashed line 806. An autonomous vehicle 100 is shown traveling in the third example first lane 802, a first target vehicle 812 is shown in the third example first lane 802 ahead of the autonomous vehicle 100, and a second target vehicle 814 is shown in the third example second lane 804 adjacent the autonomous vehicle 100.

The autonomous vehicle 100 is shown approaching the first target vehicle 812 at a longitudinal closing speed ($V_{Lo}$) at a longitudinal closing distance ($D_{Lo}$). When $V_{Lo}$ exceeds a predetermined longitudinal closing speed and/or $D_{Lo}$ is less than a predetermined longitudinal closing distance, AND a glance of the vehicle operator is fixed on a predetermined target for greater than a predetermined time limit, then the ADAS may adjust the speed of the autonomous vehicle 100 to increase the relative closing distance between the autonomous vehicle 100 and the first target vehicle 812 to preempt a take-over action by the driver. For example, the predetermined longitudinal closing speed may be 5 miles/hour or greater, the predetermined longitudinal closing distance may be 29 meters or less, the predetermined glance time limit may be 2 seconds or greater, and the predetermined glance target may be the first target vehicle 812. Alternatively, a predetermined operator glance pattern may be used to predict a driver take-over.

The second target vehicle 814 is shown approaching the autonomous vehicle 100 at a lateral closing speed ($V_{La}$) at a lateral closing distance ($D_{La}$). When $V_{La}$ exceeds a predetermined lateral closing speed and/or $D_{La}$ is less than a predetermined lateral closing distance, AND a glance of the vehicle operator is fixed on a predetermined target for greater than a predetermined time limit, then the ADAS may increase the lateral closing distance or increase the lateral overlap between the vehicles to preempt a take-over action by the driver. For example, the predetermined lateral closing speed may be 1 mile/hour or greater, the predetermined lateral closing distance may be 0.7 meters or less, the predetermined glance time limit may be 1 second or greater, and the predetermined glance target may be the second target vehicle 814. Alternatively, a predetermined operator glance pattern may be used to predict a driver take-over.

The above disclosed systems and methods provide an enhanced quality of experience of the vehicle operator by reducing the perceived need or desire for the vehicle operator to take-over control from the ADAS and by reducing the frequency of hand-over requests for the vehicle operator to take-over control from the autonomous vehicle.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of managing an operator take-over of an autonomous vehicle, comprising:
   autonomously controlling the autonomous vehicle;
   gathering, by at least one exterior sensor, information on an exterior surrounding of the autonomous vehicle;
   analyzing the gathered information on the exterior surrounding of the autonomous vehicle to determine an upcoming traffic pattern;
   gathering, by at least one interior sensor, information on an operator of the autonomous vehicle;
   analyzing the gathered information on the operator of the autonomous vehicle to determine an operator behavior in response to the upcoming traffic pattern;
   predicting an operator perceived need to take-over control of the autonomous vehicle based on the determined operator behavior in response to the upcoming traffic pattern; and
   autonomously initiating a predetermined vehicle response based on the predicted operator perceived need to take-over control of the autonomous vehicle, wherein the predetermined vehicle response eliminates the predicted operator perceived need to take-over control of the autonomous vehicle.

2. The method of claim 1, wherein predicting the operator perceived need to take-over control of the autonomous vehicle comprises: searching a data base containing a plurality of historical traffic patterns and a plurality of historical operator behavior and resulting actions in response to the plurality of historical traffic patterns.

3. The method of claim 2, wherein predicting the operator perceived need to take-over control of the autonomous vehicle further comprises: comparing the determined operator behavior in response to the upcoming traffic pattern to a similar historical traffic pattern and a historical operator behavior and resulting action in response to the similar historical traffic pattern.

4. The method of claim 1, wherein analyzing the gathered information on the operator of the autonomous vehicle to determine an operator behavior in response to the upcoming traffic pattern includes analyzing at least one of a glance, a facial expression, a body movement, and a posture of the operator.

5. The method of claim 1, wherein the information on an exterior surrounding of the autonomous vehicle and the information on the operator of the autonomous vehicle are simultaneously gathered and analyzed.

6. The method of claim 1, wherein gathering information on an exterior surrounding of the autonomous vehicle includes receiving exterior information wirelessly by vehicle-to-everything (V2X) communications.

7. The method of claim 1, wherein the predetermined vehicle response includes initiating a vehicle maneuver to eliminate the perceived need to take-over control of the autonomous vehicle.

8. A method of managing a vehicle operator's intent to take-over control of an autonomous vehicle, comprising:
   autonomously controlling the autonomous vehicle;
   gathering, by at least one exterior sensor, information on an upcoming traffic pattern;
   gathering, by at least one interior sensor, information on a behavior of the vehicle operator;
   analyzing the behavior of the vehicle operator in response to the upcoming traffic pattern to determine a perceived need of the vehicle operator to take-over control of the autonomous vehicle; and
   autonomously initiating a change in a dynamic of the autonomous vehicle to eliminate the perceived need of the vehicle operator to take-over control of the autonomous vehicle.

9. The method of claim 8, wherein the exterior information includes the dynamic of the autonomous vehicle, a road geometry, a target vehicle, and a vehicle dynamic of the target vehicle.

10. The method of claim 9, wherein the behavior of the vehicle operator includes at least one of a glance of the eyes, facial expression, body gesture, and body posture.

11. The method of claim 8, wherein analyzing the behavior of the vehicle operator includes searching for a historical vehicle operator's response to a similar historical upcoming traffic pattern.

12. The method of claim 9, wherein initiating the change in the dynamic of the autonomous vehicle includes increasing a distance between the autonomous vehicle and an adjacent vehicle.

13. A method of managing a warning priority to an operator of an autonomous vehicle, comprising:
   gathering exterior information on a surrounding about the autonomous vehicle;
   gathering interior information on the operator of the autonomous vehicle;
   analyzing the exterior information to determine an upcoming traffic pattern;
   analyzing the interior information to determine an operator behavior in response to the upcoming traffic pattern;

predicting an operator perceived need to take-over control of the autonomous vehicle based on the determined operator behavior in a response to the determined upcoming traffic pattern; and prioritizing a warning based on the predicted operator perceived need to take-over control of the autonomous vehicle.

14. The method of claim 13, wherein predicting the operator perceived need to take-over control of the autonomous vehicle is based on the determined operator behavior in a response to the determined upcoming traffic pattern, comprises:

searching a historical data base for a historical traffic pattern similar to the determined upcoming traffic pattern and a historical operator behavior and action in response to the historical traffic pattern.

15. The method of claim 14, wherein prioritizing the warning based on the predicted operator perceived need to take-over control of the autonomous vehicle, comprises: not issuing an alert when the predicted operator perceived need to take-over control of the autonomous vehicle is greater than a predetermined probability threshold.

16. The method of claim 13, wherein the behavior of the vehicle operator may be determined based on one or more of: eye glances, facial expressions, body gestures, and other relevant biometric factors exhibited by the vehicle operator.

\* \* \* \* \*